Figure 1:
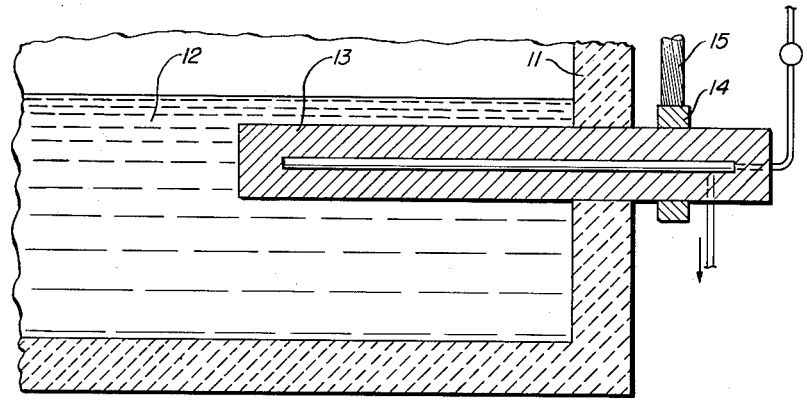

June 26, 1956

I. PEYCHES 2,752,233

METHOD FOR EXTRACTING SIMPLE ELEMENTS FROM
FUSIBLE MATERIALS CONTAINING THEM

Filed July 14, 1954

INVENTOR.
IVAN PEYCHES
BY
*Bauer and Seymour*
ATTORNEYS

United States Patent Office 2,752,233
Patented June 26, 1956

2,752,233
METHOD FOR EXTRACTING SIMPLE ELEMENTS FROM FUSIBLE MATERIALS CONTAINING THEM

Ivan Peyches, Paris, France, assignor to Societe Anonyme des Manufactures des Glaces et Produits Chimiques de St. Gobain, Chauny & Cirey, Paris, France Application July 14, 1954, Serial No. 443,349

Claims priority, application France March 8, 1948

6 Claims. (Cl. 75—10)

This application is a continuation in part of my application Serial No. 80,247, filed March 8, 1949, now abandoned.

My invention has for its object to provide a process for extracting metals and metalloids which are present in the form of oxygenated compounds, particularly metal and metalloid oxides and oxygenated salts of metals and metalloids, in materials that can be brought to the molten state, and particularly in minerals, ores, scoria, dross, and gangues poor in such elements. This process is epecially useful in cases where such materials are so poor in the metal or metalloid that the usual metallurgy treatments are inoperative or too inefficient for satisfactory use.

In many industrial metallurgical processes the dross, slag, and scoria contain valuable quantities of metals or metalloids, but in such low concentration as to be unrecoverable by standard methods. It is an object of this invention to recover such of these metals and metalloids as can be released and vaporized in the molten dross, slag, or scoria in which they are found.

Many ores and minerals contain only low percentages of valuable metals or metalloids, and standard methods fail to recover them. It is an object of the invention to recover such of these metals and metalloids as can be reduced and vaporized at the temperature of the molten ore or mineral in which they are found.

It has heretofore been the general practice to reduce oxygenated metallic materials of the type described by mixing them in more or less finely divided condition with a more or less finely divided reducing agent, such as coal, and bringing them to a temperature at which the oxidized compounds are reduced, the metal or metalloid is freed, and either gathers in a sump as a liquid, or passes off through the bath as a vapor, as is the case with magnesium. In such prior practice the entire mixture is brought to a temperature at which the materials are reduced, the dross and slag are fused and made molten, and the metal gathers as a liquid, or passes off as a vapor at the temperature of the furnace throughout the whole surface of the mixture. This has required the maintenance of the whole mass of material at very high temperature in order to keep the reduction going throughout the mass. So far as known, no system has heretofore been developed by which a limited part of a bath only can be brought to the desired temperature, and the evolution of metal vapor and its recovery, be restricted to a limited part and volume of the whole mass. It is an object of this invention to carry out the reduction of a fused ore, mineral, gangue, dross, slag, scoria or the like upon a limited part of the fused mass. It is also an object to remove the metal vapor from the bath as soon as it forms, eliminating its passage through any considerable part of the fused mass.

According to the process which is the object of my invention, there is provided, in a bath containing the oxygenated raw material in the molten state, at least one body constituted by an electrically conductive substance, being a reducing agent capable of reducing the oxygenated compound or compounds of the element or elements to be extracted, and which is impermeable to the bath but permeable to the vapors of said elements. In this process the oxygenated compounds are brought to reducing temperature in the neighborhood of the reducing body, and are there subjected to reduction, the metal or metalloid being freed, vaporized, and drawn off through the body. The vaporized metal is condensed inside said body or in a cavity connected therewith.

The objects of the invention are accomplished generally speaking by melting an oxygenated metallic or metalloid raw material, of the type of which the metal can be freed as a vapor at the temperature of such melting, reducing the molten raw material by bringing it into contact with a porous reducing body that is permeable to the vapor of the metal and impermeable to the liquid of the molten bath, and drawing off the freed, vaporized metal or metalloid through the reducing body.

In general this reducing body is electrically conductive, is immersed in the molten bath, is porous, and is hollow. It is an electrode or a resistor or both. It is supplied with sufficient current to raise the molten bath in its vicinity to a temperature at which the reduction goes forward satisfactorily, and the freed metal or metalloid is vaporized. It is porous and its porosity is of such degree that it is permeable to metal vapor, but not to the liquids of the molten bath, which is a state not too difficult to attain as the viscosity of such baths is quite high, and bodies of considerable density have the requisite degree of permeability. Porosity may be defined by the pore size but this porosity changes, for the same pore sizes, with the temperature, pressure and thickness of the porous body.

The natural graphites of Italy are of relatively low density and of the required selective porosity, and may be used in the invention by shaping to the desired form of the electrode and mounting in a furnace. Those natural graphites having a density circa 1.6 are very satisfactory. The shaping may be carried out by simple carving of a block of the graphite to the desired size and configuration. A slight pressure difference between the outside and inside of such electrodes, such for example, as a few tens of cm. of water, is sufficient to cause them to act efficiently.

The rapidity of filtration, by which term we mean the separation of the vapors from the molten mass and the passage through the porous body is affected for a given element to be extracted, and the temperature and pressure needed for such extraction, by the size of the pores, the thickness of the electrode wall, and the pressure differential between the inside and outside of the wall, but operativeness depends only on the permeability of the electrode to vapors and its impermeability to the melt.

Thus, the porosity and/or the thickness of this body may be chosen so that the pressure loss resulting from the passage of the vapors through said body will be small enough to permit the vapors to pass through it without having any tendency to escape through the bath. To the same end, it is possible to provide such conditions that the vapor pressure of the element in the neighborhood of the reducing body will be lower than the hydrostatic pressure to which said element is subjected, particularly by controlling the temperature in the neighborhood of the body or the position of the latter. It is also possible, in order to reduce the risk of an evolvement through the bath, to provide an under-pressure facilitating the passage of the vapors through the body.

Assuming that one wishes to utilize atmospheric pressure inside the electrode, the method of securing a sufficient pressure differential to compel the metal, reduced and vaporized on its surface, to pass through the electrode is to lower the electrode in the melt until the value of the hydrostatic pressure on its surface is well above atmospheric. This can be accomplished scientifically by determining the vapor pressure on the uppermost surface of the electrode at which the vapors of a particular metal flow through the pores of a particular electrode, but in practice the electrode is simply lowered in the melt until vapors of the metal cease to be released at the surface of the bath. As the electrode becomes thinner by consumption it can be raised. The difference between internal and external pressure need be only on the order of a few tens of centimeters of water to prevent escape of vapor from the surface of the melt. With fine pores, electrodes may be thinner and with coarse pores thicker and still produce a satisfactory rate of filtration. As the vapor pressure of a metal varies with the temperature, and as there is a considerable range of temperatures within which the bath is molten and the metal is a vapor, a temperature in this range may be chosen at which the vapor pressure of the metal is as far below the hydrostatic pressure of the bath as consistent with the fluidity of the bath and thus facilitate the expulsion of the metal vapor from the bath through the electrode.

It is to be observed that the foregoing variations in the process may be used to accelerate or retard the rate of filtration but that filtration itself depends on the permeability of the electrode to vapor and its impermeability to liquid.

According to a particularly advantageous embodiment of the invention, said body itself is used for bringing the bath to the temperature required for reducing the oxygenated compounds and for vaporizing the elements. Such result may be obtained namely by using said body as a heating resistance through which an electric current is caused to pass. The heating up of the resistance transmits the required heat to the bath in contact with it. Another advantageous method consists, in case the bath is electrically conductive, to use the porous reducing body as an electrode transmitting an electric current to at least one other electrode through the bath.

The following metallurgical reducing solid agents are also useful as electrodes: synthetic graphite, silicon carbide, carbon other than graphite.

*Example 1*

Preparation of a porous reducing electrode from natural graphite:

Natural graphite was used in its native condition, the way it was extracted from the Italian mines. The block was shaped by any one of the usual methods of cutting such stones into a hollow cylinder 120 millimeters in diameter. The inside recessed cavity was 20 millimeters in diameter; the wall thickness was thus of 50 millimeters. The average pore size of this natural graphite are on the order of 5 to 50 microns.

Another feature of the invention is that the bath, in the neighborhood of the reducing body, may be brought to a higher temperature than any other point of the bath. Inside the bath there is thus obtained a stirring action resulting from the convection currents due to the unequal distribution of the temperatures. Such currents have the effect of progressively causing all the bath material to pass through the reduction and vaporization zone; the total extraction of the desired elements is thus obtained.

This zone of higher temperature in the neighborhood of the reducing body may be instituted by using the latter as an electrode, or as a resistor, and by so providing its surface of contact with the bath that the density of the electrical current lines in the neighborhood of the electrode will be greater than in any other point of the bath remote from the electrodes. As a result, in the neighborhood of the electrodes there is localized a zone where the developed electric energy, and consequently the temperature rise, is greater than in any other region of the bath.

Owing to such feature of the invention, the extraction can be cheaper because the general temperature of the bath may be noticeably lower than the reduction temperature as a result of the localization of said operation.

The body made of the reducing substance may have any desired shape. In particular, it may have the general shape of a bar penetrating into the bath through at least one of the walls of the furnace. Such bar may advantageously have a longitudinal cavity which does not open into the bath except by the porosity of its wall, and where a selected atmosphere may be maintained at a desired pressure, and even of a particular nature. As above stated, in the cavity a vacuum may be maintained to facilitate the extraction of the vapors resulting from the volatilization of the reduction products. By filling the cavity with an inert gas, at atmospheric or lower pressure, the vapors of the metal may be prevented from again being oxidized. The porous body may also be put into communication with an exterior chamber at a suitable vacuum where condensation may be provoked by cooling for example.

I ascertained that the process according to my invention is useful on ordinary ores and that in particular it may be used for the extraction of pure elements such as antimony or beryllium from baths of molten silicates of those metals or metalloids where they are present in small proportions.

*Example 2*

EXTRACTION OF ANTIMONY

The analysis of the raw material treated gave the following composition:

| | Parts |
|---|---|
| Sand | 260 |
| Limestone | 90 |
| Carbonate of soda | 85 |
| Sodium sulphate | 3 |
| Sodium nitrate | 5 |
| Antimony oxide | 3 |

The operation is described hereinafter with reference to Figure 1 of the attached drawings.

The raw material was loaded into a furnace 11 and melted by passage of an electric current through it. One of the electrodes 13 was of the type described in Example 1 and the disposition of the furnace was the one shown of Figure 1. The electrode was located horizontally in such a way that the upper generatrix of the cylinder was 5 centimeters below the bath level; the average pressure on the electrode surface was thus, 26 grams per square centimeter. The electrode was supplied by means of a collar 14 connected to a bar 15, with current sufficient to maintain the temperature, near the electrode surface, at 1.400–1.460° C.

The porosity of the graphite used and having the pore size above described, changes with the temperature and may be defined by the quantity of antimony oxide vapour which passes through the porous body for each temperature. For 1.400° C. and the given pressure, a quantity of .25 cubic centimeter, per square centimeter of surface, per centimeter of thickness of the wall, and per second of time was able to pass through.

Under these conditions, antimony free from all admixture, is extracted from the cavity of the electrode. The quantity of this antimony depends on the pressure inside the electrode; but the method works even for atmospheric pressure. For a vacuum, inside the electrode, of 5 meters $H_2O$ and for 250 kilograms of raw material hourly loaded, 500 grams of pure antimony were hourly recovered.

The antimony was vaporized as antimony oxide and reduced as pure metal by the graphite, which reduction qualities prevent said metal from getting oxidized again.

Said metal is progressively drawn from the electrode cavity and cooled in a non-oxidizing atmosphere, where it becomes solid, below 630°, under atmospheric pressure.

Example 3

EXTRACTION OF BERYLLIUM

Beryllium was extracted, by the same method, from the metasilicate of beryllium and aluminum $(S_2O_3)_6Gl_3Al_2$ usually called beryl, which is often mixed with sands, with percentages, comparable with those of the above example.

For the same disposition of electrode, the temperature was about 1.450–1.500° C. and the pressure inside the electrodes was reduced to one tenth of an atmosphere.

When the bath contains several oxidized elements which can be reduced and extracted by using the process of my invention, it is possible to profit by the different conditions of temperature at which the several oxides are reduced and to control the local temperature of the operation, and also the extraction pressure, to separate the elements from one another.

The elements which are above mentioned as susceptible of being obtained according to the process of the invention are given merely as non-limitative examples.

Figure 2:
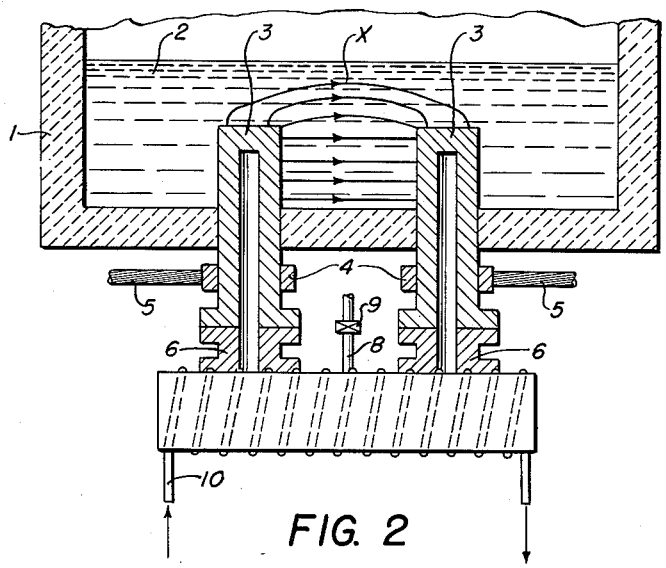

With reference to the attached drawing, on Figure 2, there is described hereunder, also as a non-limitative example, a device according to the invention in which the porous reducing body acts as an electrode.

The Figure 2 of the attached drawing is a vertical section of such device showing a tank 1 containing a bath 2 of molten raw material of the types described above as such bath is a conductor for electricity, it can be used as a resistor between electrodes projecting into it. At least two porous graphite electrodes 3 penetrate into the bath through holes provided in the tank bottom; the current is fed to said electrodes by collars 4 connected to bars 5 connected to a current supply. The current passes between the electrodes as shown by arrows "x." The current diffuses through the bath, but is concentrated at the surface of the electrodes, so the bath is hotter in their neighborhoods than in any other part of the bath. The electrodes are hollow and their cavities are connected with a chamber 7, by means of insulating bodies 6, with suitable tight joints. Such chamber may be brought into communication, through a pipe 8 and a valve 9 with any suitable device, such as a vacuum pump, permitting one to maintain a given degree of pressure in said chamber, and even to fill it with the desired gas or liquid at a selected pressure.

The elements being in the oxidized form in the bath of materials are reduced in contact with the electrodes, and the products resulting from the reduction, being volatile at the temperature prevailing in the neighborhood of the electrodes, are transformed into vapors, such vapors penetrate into the cavities provided in the electrodes and gather in chamber 7 where they condense, such condensation operation being facilitated if need be by a cooling device diagrammatically shown at 10 as a spiral tube through which a cooling fluid may be run.

It will be understood that the invention is not to be confined to the above described examples, and may be used for the extraction of pure elements, such as arsenic or cadmium from bath of molten ores, where they are in small percentages.

I claim:

1. The method of extracting pure elements of the metal and metalloid class and of the type of arsenic, antimony, beryllium, cadmium and magnesium from poor gangues comprising molten metal silicates that comprises fusing and reducing the silicates and vaporizing the released metal in a closed furnace by means of electrodes which pass heating current through the molten silicates, said electrodes being porous, hollow reducing agents, having pores on the order of 5–50 microns, and establishing a differential pressure between the inside and outside of the electrodes tending to draw the reduced metal into the hollows of the electrodes, and condensing the reduced metal after it is drawn from the bath.

2. The method of extracting elements of the metal and metalloid class which volatize alone or as their oxides below the melting point of graphite from a fusible, oxygenated compound, of the element, of the type of ores, minerals, gangues, scoria, dross, and slag, that comprises covering a plurality of solid, porous, hollow graphite electrodes with a molten mass of said fusible, oxygenated compound, heating the mass, by passing electric current through said mass between said electrodes, at a temperature at which the electrode remains solid, the oxygenated compound is reduced and the reduced metal is vaporized, and removing vaporized metal from the mass through said porous electrodes by maintaining in said porous electrodes a pressure less than that in the mass in contact with the surface thereof.

3. The method of recovering elements from the class consisting of metals and metalloids of the type which are vapors at the temperatures at which their molten oxygenated compounds undergo reduction, that comprises subjecting an oxygenated compound of such element, of the type of minerals, ores, slag, scoria, dross and gangue to temperatures sufficient to melt such compound, heating a limited portion of said melt, to a temperature at which the said element is vaporized, upon the surface of an electrically conductive vapor-permeable, melt-impermeable heating element of the type of electrodes and resistors, while maintaining other portions of said melt at a lower temperature, said heating element being comprised of a reducing agent of the type which maintains its phase at said vaporizing temperature except as it is consumed in the reduction, such as carbon and silicon carbide, and drawing off the vaporized element through said heating element and capturing it.

4. The method of claim 3 in which the element is vaporized as its oxide, before reduction.

5. The method of claim 3 in which the element is vaporized as such, after reduction.

6. The method of claim 3 which includes improving the rate of recovery and the passage of the element through the heating element by adjusting the depth of the electrode beneath the surface of the melt.

References Cited in the file of this patent

UNITED STATES PATENTS

| Number | Name | Date |
|---|---|---|
| 614,930 | Burton | Nov. 29, 1898 |
| 957,058 | Hixon | May 3, 1910 |
| 1,650,894 | Koehler | Nov. 29, 1927 |
| 2,263,549 | Peyches | Nov. 18, 1941 |
| 2,383,856 | Hansgirg | Aug. 28, 1945 |